(12) United States Patent
Khubaib et al.

(10) Patent No.: US 8,285,969 B2
(45) Date of Patent: Oct. 9, 2012

(54) REDUCING BROADCASTS IN MULTIPROCESSORS

(75) Inventors: Khubaib Khubaib, Austin, TX (US); Moinuddin Khalil Ahmed Qureshi, White Plains, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 12/552,676

(22) Filed: Sep. 2, 2009

(65) Prior Publication Data

US 2011/0055515 A1 Mar. 3, 2011

(51) Int. Cl.
*G06F 12/06* (2006.01)
(52) U.S. Cl. .................. 711/207; 711/E12.078
(58) Field of Classification Search .......... 711/207
See application file for complete search history.

(56) References Cited

U.S. PATENT DOCUMENTS

| | | | |
|---|---|---|---|
| 5,197,139 A | 3/1993 | Emma et al. | |
| 5,522,058 A | 5/1996 | Iwasa et al. | |
| 5,829,029 A | 10/1998 | Shelly et al. | |
| 5,860,146 A * | 1/1999 | Vishin et al. | 711/207 |
| 6,631,447 B1 | 10/2003 | Morioka et al. | |
| 2002/0144079 A1* | 10/2002 | Willis et al. | 711/205 |
| 2008/0215819 A1 | 9/2008 | Cantin et al. | |
| 2010/0185831 A1* | 7/2010 | Iguchi | 711/207 |
| 2010/0235580 A1* | 9/2010 | Bouvier | 711/129 |

OTHER PUBLICATIONS

Lenoski et al., "The Directory-Based Cache Coherence Protocol for the DASH Multiprocessor", Proceedings of the 17th Annual International Symposium on Computer Architecture, pp. 148-159 (1990). The Year of Publication is Sufficiently Earlier Than Applicants' Effective US and Foreign Filing Date Such That the Particular Month of Publication Is Not an Issue.

* cited by examiner

*Primary Examiner* — Kenneth Lo
(74) *Attorney, Agent, or Firm* — Law Offices of Ira D. Blecker, P.C.

(57) ABSTRACT

Disclosed is an apparatus to reduce broadcasts in multiprocessors including a plurality of processors; a plurality of memory caches associated with the processors; a plurality of translation lookaside buffers (TLBs) associated with the processors; and a physical memory shared with the processors memory caches and TLBs; wherein each TLB includes a plurality of entries for translation of a page of addresses from virtual memory to physical memory, each TLB entry having page characterization information indicating whether the page is private to one processor or shared with more than one processor. Also disclosed is a computer program product and method to reduce broadcasts in multiprocessors.

19 Claims, 3 Drawing Sheets

REDUCING BROADCASTS IN MULTIPROCESSORS

BACKGROUND OF THE INVENTION

The present invention relates generally to reducing broadcast messages in a multi-processor system and, more particularly, to using the translation lookaside buffer having page table extensions to reduce such broadcasts.

Modern computers use a virtual addressing scheme which allows the computer to address an address space larger than its internal memory. Before memory can be accessed in such a scheme, however, each virtual address must be translated to a physical address. Unfortunately, the translation process ordinarily requires multiple accesses to page and segment tables in the computer's memory, which significantly degrades the computer's performance.

To overcome this problem, a translation lookaside buffer (TLB) is used to maintain the most recently used virtual address to physical address mappings. Each TLB entry ordinarily contains a virtual address, a physical address mapped to the virtual address, and control information such as validity flags. Typically, the TLB is searched to see if a physical address mapping for a given virtual address is present. If a physical address mapping is present in the TLB, the physical address may be obtained directly from the TLB, thus avoiding the long latency lookup in the page and segment tables.

A TLB is like a cache that memory management hardware uses to improve the latency of the virtual to physical address translation. A TLB has a fixed number of slots that contain page table entries, which map virtual addresses to physical addresses. It is typically a content-addressable memory (CAM), in which the search key is the virtual address and the search result is a physical address. If the requested address is present in the TLB, the CAM search yields a match quickly, after which the physical address can be used to access cache/memory. This is called a TLB hit. If the requested address is not in the TLB, the translation proceeds by looking up the page table in a process called a page walk. The page walk is a high latency process, as it involves reading the contents of multiple memory locations and using them to compute the physical address. After the physical address is determined, the virtual address to physical address mapping and the protection bits are stored in the TLB for future use.

To provide a consistent view of the contents of the memory to the multiple processors in the systems, it is required to maintain cache coherence in multiprocessors. Two classes of cache coherence protocols are well-known in the literature: directory-based protocols and bus-based snoopy protocols. Directory-based protocols require a given memory request to be streamlined through a global directory lookup, followed by multi-cast to the owners of the data to take necessary action (invalidate/update) as a result of the current request, thus making the directory access to be in the critical path, and hence a bottleneck. Snoopy protocols broadcast the current request to all the cache directories, and wait for their responses to determine the action (invalidate/update) as a result of the current request, thus making the number of snoop probes grow as the square of the number of processors in the system, resulting in substantial increase in traffic and power consumption as the systems grow.

In multiprocessor systems, snoop traffic generated to maintain cache coherence consumes a significant portion of on-chip and off-chip bandwidth and power. The present invention describes a method and an apparatus to reduce the broadcast messages generated by the snoopy cache coherence protocol in a typical multiprocessor system.

BRIEF SUMMARY OF THE INVENTION

In multiprocessor systems, snoop traffic generated to maintain cache coherence consumes a significant portion of on-chip and off-chip bandwidth and power. The present invention describes a method and an apparatus to reduce the broadcast messages generated by the snoopy cache coherence protocol in a typical multiprocessor system.

The various advantages and purposes of the present invention as described above and hereafter are achieved by providing, according to a first aspect of the invention, an apparatus to reduce broadcasts in multiprocessors including a plurality of processors; a plurality of memory caches associated with the processors; a plurality of translation lookaside buffers (TLBs) associated with the processors; and a physical memory shared with the processors, memory caches and TLBs; wherein each TLB comprises a plurality of entries for translation of a page of addresses from virtual memory to physical memory, each entry having page characterization information indicating whether the page is private to one processor or shared with more than one processor.

According to a second aspect of the invention, there is provided an apparatus to reduce broadcasts in multiprocessors including a cluster including a plurality of processors; a plurality of memory caches associated with the processors with there being at least one memory cache for each processor; a plurality of translation lookaside buffers (TLBs) associated with the processors with there being at least one TLB for each processor; and a physical memory shared with the processors, memory caches and TLBs; wherein each TLB comprises a plurality of entries for translation of a page of addresses from virtual memory to physical memory, each entry having page characterization information indicating whether the page is private to one processor or shared with more than one processor.

According to a third aspect of the invention, there is provided a method to reduce broadcasts in multiprocessors comprising a plurality of processors; a plurality of memory caches associated with the processors; a plurality of translation lookaside buffers (TLBs) associated with the processors and comprising a plurality of entries for translation of a page of addresses from virtual memory to physical memory; and a physical memory shared with the processors, memory caches and TLBs, the method including the steps of processing a memory request from a processor; performing a lookup in at least one TLB for virtual to physical address translation; reading page characterization information from a TLB entry indicating whether the page is private to one processor or shared with more than one processor; and performing a snoop request only if the page characterization information indicates the page is shared with more than one processor.

According to a fourth aspect of the invention, there is provided a computer program product for reducing broadcasts in multiprocessors including a plurality of processors; a plurality of memory caches associated with the processors; a plurality of translation lookaside buffers (TLBs) associated with the processors and comprising a plurality of entries for translation of a page of addresses from virtual memory to physical memory; and a physical memory shared with the processors, memory caches and TLBs: a computer readable storage medium having computer readable program code embodied therewith, the computer readable program code including computer readable program code configured to process a memory request from a processor; computer readable program code configured to perform a lookup in at least one TLB for virtual to physical address translation; computer readable program code configured to read page characterization information from a TLB entry indicating whether the page is private to one processor or shared with more than one processor; and computer readable program code configured to perform a snoop request only if the page characterization information indicates the page is shared with more than one processor.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
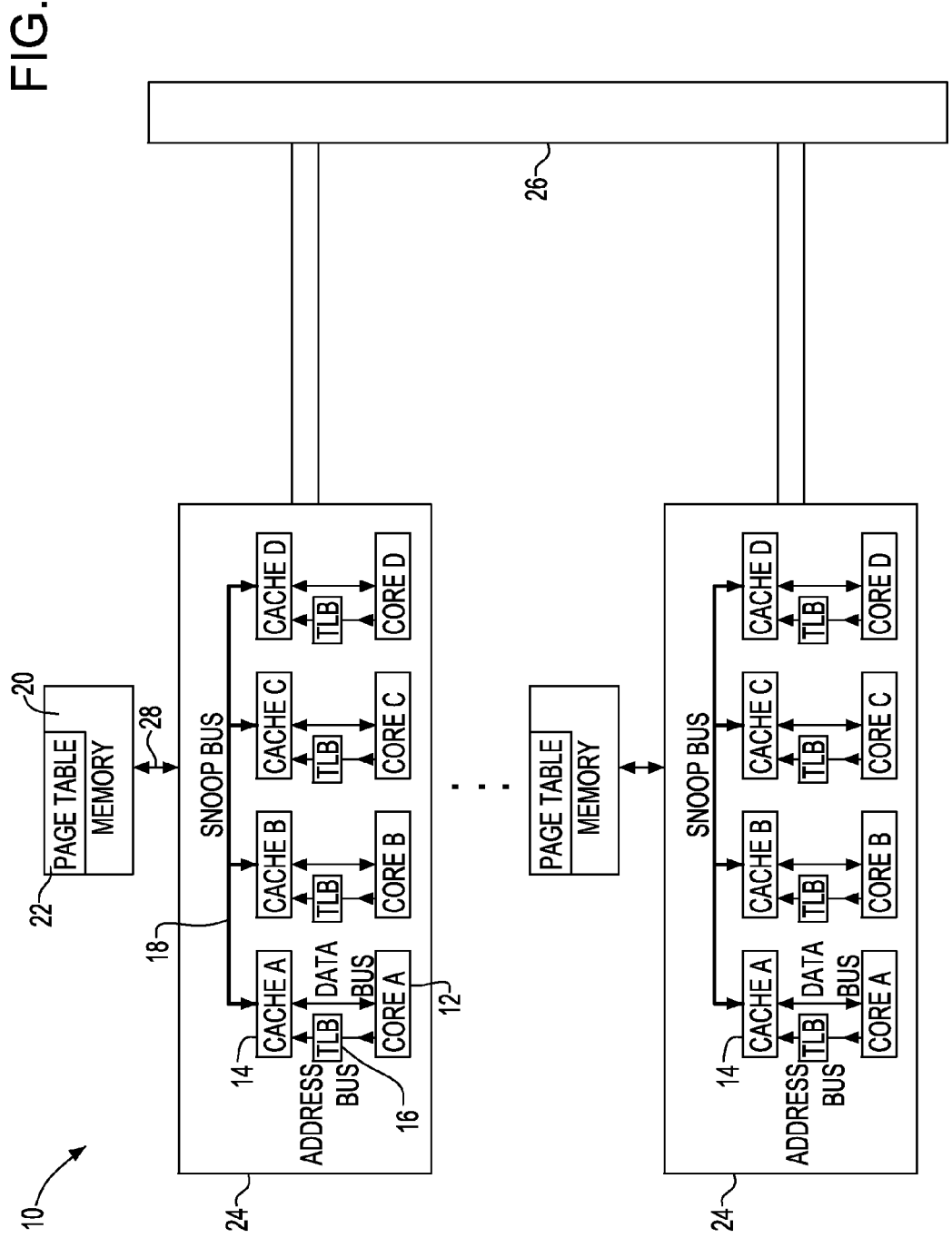
FIG. 1 is a block diagram of a multiprocessor system according to the present invention.

Referring to the Figures in more detail, and particularly referring to FIG. 1, there is shown a chip multiprocessor (CMP) system 10 having a plurality of processors or cores 12, each with a private cache 14. Processor and core may be used interchangeably throughout the discussion of the present invention. Associated with each processor 12 and cache 14 is a translation lookaside buffer (TLB) 16. Connecting caches 14 is a snoop bus 18 which is used to maintain cache coherence. A shared memory (e.g., RAM) 20 is coupled to the processors 12 caches 14, TLBs 16 by a bus 28. The group of processors 12, caches 14, TLBs 16, snoop bus 18 and memory 20 constitute a cluster 24. There may be one or a plurality of such clusters 24 connected by a high speed bus 26 to make up the CMP. Other features inherent in a CMP system are not shown as they are not relevant to the present invention. While there are four processors, caches and TLBs shown in cluster 24 in FIG. 1, there may be more or less processors, caches and TLBs depending on the computer architecture.

For purposes of illustration and not limitation, the Figures and the discussion use a CMP system to describe the invention. However, the present invention is applicable to any multiprocessor organization, such as CMP or SMP (Symmetric Multiprocessing system), using snoopy protocols to maintain cache coherence.

The problem addressed by the current invention can be framed in the following manner. If a memory request from core A does not find the data in cache A, there is a cache miss which is broadcast to all the other caches (B, C, and D in FIG. 1) in the CMP system 10. If one of the other caches in the system has a copy of the requested data, the corresponding cache line is sent to cache A, and the data requested is sent to core A. If the requested data is not present in any of the caches, the corresponding cache line is fetched from memory, and installed in Cache A, and core A's request is satisfied. If it is possible to know a priori that only one of the other caches B, C, or D has a copy of the requested data, or if none of the other caches have a copy of the data, the broadcast could have been eliminated. For example, consider the following scenarios:

Multi-programmed workloads: When each core is executing a different application, then these applications map to separate address spaces, and a cache miss in one core is unlikely to be satisfied by the other caches in the system. In such cases, all the data accessed by a core is private, and a broadcast need not be sent before satisfying a memory request of a core.

Data Parallel workloads: These applications belong to the single program multiple data (SPMD) category. In this category, the data is split across each thread (core). For example, matrix addition will split each of the three matrices (A=B+C) of the data-set equally across the four cores in a non-overlapping manner. Therefore, a cache miss in one of the caches will not be satisfied by the other caches, and it is not necessary to send snoop requests for such accesses.

Multi-threaded workloads: In this category, there is data-sharing among the threads for some region of memory, and other regions of memory are private to the individual threads. In such cases, snoop requests sent before accessing a private data is unnecessary because the other caches in the system will not have the requested thread—private data.

The present invention provides an apparatus and method to reduce snoops in a multiprocessor system and further describes a mechanism to eliminate snoops for private data using TLBs to track memory pages that are private to one processor, and disables broadcasts for such pages.

In the present invention, each TLB entry is augmented (i.e., extended) to hold information about the characteristics of the page. A page is marked "private" if it is accessed by only one processor, and marked "shared" when more than one processor accesses it. When a memory request from a core is processed, during the TLB lookup for the virtual to physical address translation, the private/shared information about the page is also stored in the TLB. If the page is marked private to only one core, then broadcast requests are not sent, thereby saving snoop traffic, latency, and power. To retain the page characterization (private/shared) after an entry is evicted from the TLB, each entry in the memory page table is also extended with the private/shared information, and is correspondingly updated when a TLB entry is replaced.

There are several advantages to the present invention. First, the present invention filters useless snoop requests for pages that are used by only one processor, thereby reducing traffic, overall response time for a request, and power consumption. Second, the present invention uses an already existing hardware structure, namely, the TLB, to store the data sharing information, and avoids additional overhead associated with tag-based filters.

The present invention will now be discussed in more detail. The present invention tracks data sharing information among multiple processors on a page granularity basis. It will be clear to those skilled in art that extending the tracking to finer or coarser than page granularity is within the scope of the present invention.

Figure 2:
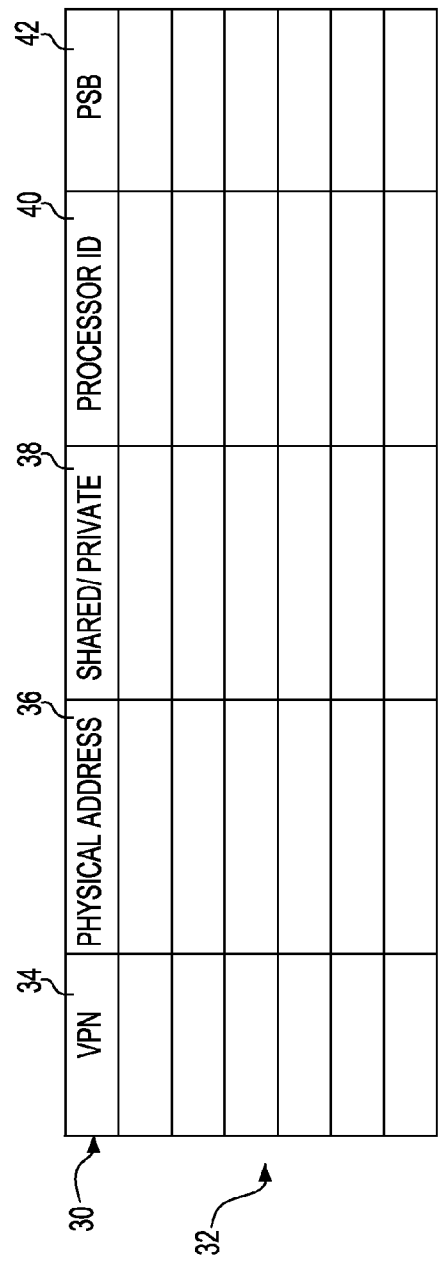
FIG. 2 is a translation lookaside buffer page table according to the present invention.

Referring now to FIG. 2, there is shown a TLB 30. The TLB 30 has a plurality of entries 32, typically 8 to 1,024 entries per TLB. Each TLB entry 32 contains a column 34 for the virtual page number (VPN). As is well known, the virtual address space of an application program is divided into pages, with each page being a block of contiguous virtual memory addresses. Pages are usually at least 4 kilobytes in size. Page tables are used to translate the virtual addresses seen by the application program into physical addresses used by the hardware to process instructions, and the TLB is a cache of the page table. Each entry in the TLB contains a mapping for a virtual page to the physical memory address at which the page is stored. Information or data in the page is actually stored in memory but is addressed in the TLB 30 or the page table.

Column 36 is where the physical address is written for each TLB entry 32. There may be other columns in a TLB 30 but they are omitted as not germane to the present invention.

In a preferred embodiment of the present invention, two new fields are added to each TLB entry 32. One such field is the "shared/private" field 38 and is a 1-bit field indicating whether the page is shared (0) with other caches, or private (1) to only one cache. The second field is a processor ID field 40, and holds the identification (ID) of the processor using data in that page. The processor ID field 40 is log (N) bits where there are N processors in the system, and gets set when the page is marked "private". When a memory request from a core is processed, during the TLB lookup for the virtual to physical address translation, the shared/private information field 38 for the page table entry 32 is also read. If the TLB entry 32 is marked private to only one processor, then a broadcast is not sent to all the processors. Further, if the processor ID field 40 of the TLB entry 32 is the same as the requesting processor, no snoop is sent. If the data is not present in the requesting processor, it is fetched directly from the memory 20 as shown in FIG. 1.

However, if the processor ID field 40 of the TLB entry 32 is different from the requesting processor, then two actions are taken. First, the shared/private field 38 of the TLB entry 32 is marked as shared (i.e., more than one processor has requested data from this page) and second, a request is sent to the processor whose processor ID field 40 was read from the TLB entry 32 to determine if the corresponding data is present in its cache 14 as shown in FIG. 1 and the data in that processor's cache 14 is updated/invalidated as determined by the coherence protocol.

On the other hand, during the TLB lookup if the shared/private field 38 of the TLB entry 32 is marked "shared", then a snoop request is sent to all the processors.

In this preferred embodiment, snoops for private data are avoided. Shared data does not distinguish between one, or many cores sharing the data, and the request is broadcast to all of the cores.

In another preferred embodiment of the present invention, snoop traffic can be further reduced by saving the page characterization in the memory page table 22, shown in FIG. 1, for future use. Whenever a TLB entry 32 is evicted, the shared/private field 38 and the processor ID field 40 of the TLB entry 32 are copied to the corresponding page table entry of the memory page table 22. When a TLB reload happens in the future, the memory page table 22 also sends the shared/private information along with the processor ID information for private pages to the TLB 30.

In another preferred embodiment of the present invention, each TLB entry 32 is extended with a bit vector field, one bit per processor in the system, called the page sharing bits (PSB) field 42 as shown in FIG. 2. When a memory request from a core is processed, during the TLB lookup for the virtual to physical address translation, the PSB field 42 is also read. The bit corresponding to the requesting processor is set in the PSB field. If the requesting processor's cache does not have the data, then a multicast request (i.e., snoop) is sent to only those processors for which the bit is set in the PSB field. This avoids unnecessary broadcasts when the data is private, or shared only by a few processors. It is another object of the present invention to further reduce snoop traffic by saving the page characterization in the memory page table 22 for future use. Whenever a TLB entry 32 is evicted, the PSB field 42 information is copied to the corresponding page table entry in the memory page table 22, and reloaded into the TLB when needed in the future.

It will be apparent to those skilled in the art, that the data sharing information maintained at page granularity in the TLB as discussed above can also be maintained at smaller granularity (sub-page granularity), and still maintained in the TLB entry 32. The mechanisms presented above to manage the private/shared information are independent of the granularity of tracking data-sharing information.

The present invention may be extended to supporting thread migration. During context switches, when a thread migrates from one processor to another, all the private data of that thread now artificially gets shared between two processors, the old one and the new one. Note that the present invention automatically handles this scenario, by marking the pages as shared by the two processors. For TLB entries 32 that are evicted and stored in the memory page table 22, all private pages will become shared because they will be accessed by the new processor. It is within the scope of the present invention to have a circuit that identifies that the PSB field entries 42 have old processor as the single owner and these PSB field entries 42 are now moving to the shared category. Once this can be identified, all the cache lines for a particular page can be invalidated from the old processor and moved to the new processor. The PSB field entry 42 in this case can safely indicate that the new processor is the sole owner, and deem the page as private. Note that this invalidation and moving of lines on a thread migration will also have the added benefit of prefetching the useful lines to the desired cache.

Figure 3:
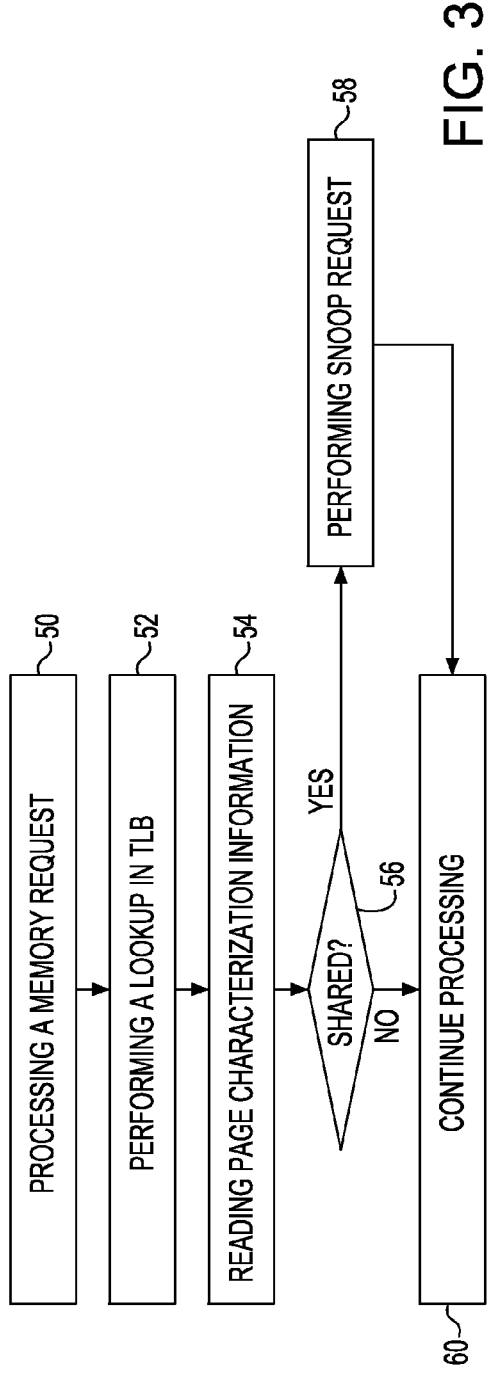
FIGS. 3 and 4 are flow charts illustrating the implementation of the method of the present invention.

The apparatus of the present invention may be used to implement a method to reduce broadcasts in multiprocessors as illustrated in FIG. 3. The first step of the method is processing a memory request from a processor as indicated by block 50 followed by performing a lookup in at least one TLB for virtual to physical address translation as indicated by block 52. Thereafter, the method continues by reading page characterization information from a page table entry in the TLB indicating whether the page table entry is private to one processor or shared with more than one processor as indicated by block 54. If it is decided in block 56 that the page characterization information is shared with more than one processor, then the method continues by performing a snoop request, as indicated by block 58. After the snoop request is performed, the data is handled normally by continuing processing as indicated by block 60. Referring back to block 56, if it is decided that the page characterization information is not shared with more than one processor, thereby indicating that the data is private, then the next step is continuing processing in a normal manner as indicated by block 60.

Figure 4:
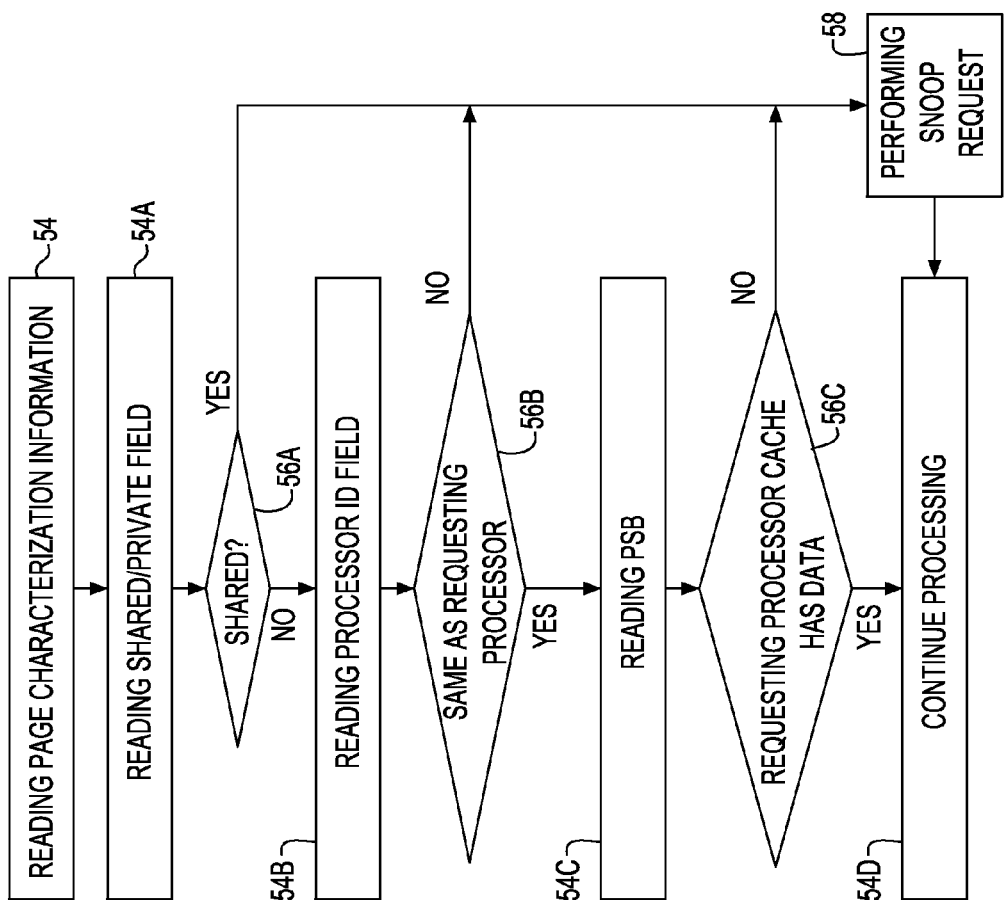

The step of reading page characterization information, block 54, can be implemented by one preferred methodology as explained in more detail in FIG. 4. In one preferred embodiment of the invention, reading page characterization information includes reading the shared/private field, block 54A, of the TLB entry followed by reading the processor ID field, block 54B in the TLB entry. When reading the shared/private field, if it is decided in block 56A that the page information is shared with other processors, then the process goes directly to performing a snoop request, block 58. If it is determined in block 56A that the page information is private, then the method proceeds to reading the processor ID field, block 54B. If it is determined in block 56B that that the owner of the page information as indicated in the processor ID field is different than the requesting processor, then the process proceeds to performing a snoop request, block 58. If it is determined in block 56B that the requesting processor and the owning processor are the same, then the process may go to continuing processing, block 60, as indicated by line 64. In the processing mentioned above, once the step of performing a snoop request, block 58, has occurred, the process proceeds to continuing processing, block 60.

In another preferred embodiment of the invention, another implementation of reading page characterization information may include a further step of reading the PSB, as indicated by block 54C, in FIG. 4. If it is determined in block 56C that the requesting processor does not have the page information in its cache, then the process proceeds to performing a snoop request, block 58. Alternatively, if it is determined in block 56C that the requesting processor does have the page information in its cache, then the process proceeds to continue processing, block 60. In the processing mentioned above, once the step of performing a snoop request, block 58, has occurred, the process proceeds to continuing processing, block 60.

Figure 5:
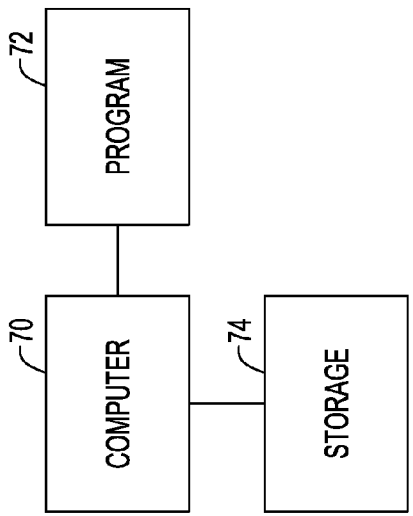
FIG. 5 is a block diagram illustrating an exemplary hardware environment of the present invention.

FIG. 5 is a block diagram that illustrates an exemplary hardware environment of the present invention. The present invention is typically implemented using a computer 70 comprised of microprocessor means, random access memory (RAM), read-only memory (ROM) and other components. The computer may be a personal computer, mainframe computer or other computing device. Resident in the computer 70, or peripheral to it, will be a storage device 74 of some type such as a hard disk drive, floppy disk drive, CD-ROM drive, tape drive or other storage device.

Generally speaking, the software implementation of the present invention, program 72 in FIG. 5, is tangibly embodied in a computer-readable medium such as one of the storage devices 74 mentioned above. The program 72 comprises instructions which, when read and executed by the microprocessor of the computer 70 causes the computer 70 to perform the steps necessary to execute the steps or elements of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above in with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

We claim:

1. An apparatus to reduce broadcasts in multiprocessors comprising:
    a plurality of processors;
    a plurality of memory caches associated with the processors;
    a plurality of translation lookaside buffers (TLBs) associated with the processors; and
    a physical memory shared with the processors, memory caches and TLBs;
    wherein each TLB comprises a plurality of entries for translation of a page of addresses from virtual memory to physical memory, each TLB entry having a field indicating a virtual page number with each page being a block of contiguous virtual memory addresses and each entry having page characterization information indicating whether the page is private to one processor or shared with more than one processor, wherein the page characterization information comprises each TLB entry having a one bit field indicating whether the page is private or shared, and
    wherein the page characterization information comprises each TLB entry having a field indicating the processor identification (ID) of the processor owning the page.

2. The apparatus of claim 1 wherein the processor ID field being log (N) bits where N is the number of processors in the apparatus.

3. The apparatus of claim 2 wherein each TLB entry further comprises a page sharing bits field indicating a processor requesting the page.

4. The apparatus of claim 1 wherein the physical memory further comprises a page table and the page characterization information of each entry in the TLBs is saved in the page table of the physical memory.

5. The apparatus of claim 2 wherein the physical memory further comprises a page table having page table entries and wherein the field indicating whether the page in the TLB entry is private or shared and the field indicating the processor identification (ID) of the processor owning the page in the TLB entry are saved in the page table entry of the physical memory.

6. The apparatus of claim 3 wherein the physical memory further comprises a page table having page table entries and wherein the field indicating whether the page in the TLB entry is private or shared, the field indicating the processor ID of the processor owning the page in the TLB entry and the page sharing bits field indicating the processor requesting the page in the TLB entry are saved in the page table of the physical memory.

7. An apparatus to reduce broadcasts in multiprocessors comprising:
    a cluster comprising:
    a plurality of processors;
    a plurality of memory caches associated with the processors with there being at least one memory cache for each processor;
    a plurality of translation lookaside buffers (TLBs) associated with the processors with there being at least one TLB for each processor; and
    a physical memory shared with the processors, memory caches and TLBs;
    wherein each TLB comprises a plurality of entries for translation of a page of addresses from virtual memory to physical memory, each TLB entry having a field indicating a virtual page number with each page being a block of contiguous virtual memory addresses and each entry having page characterization information indicating whether the page is private to one processor or shared with more than one processor, wherein the page characterization information comprises each TLB entry having a one bit field indicating whether the page is private or shared, and
    wherein the page characterization information comprises each TLB entry having a field indicating the processor identification ID of the processor owning the page.

8. The apparatus of claim 7 further comprising a plurality of clusters connected by a bus.

9. A method to reduce broadcasts in multiprocessors comprising a plurality of processors; a plurality of memory caches associated with the processors; a plurality of translation lookaside buffers (TLBs) associated with the processors and comprising a plurality of entries for translation of a page of addresses from virtual memory to physical memory, each TLB entry having a field indicating a virtual page number with each page being a block of contiguous virtual memory addresses; and a physical memory shared with the processors, memory caches and TLBs, the method comprising the steps of:
    processing a memory request from a processor;
    performing a lookup in at least one TLB for virtual to physical address translation;
    reading page characterization information from a TLB entry indicating whether the page is private to one processor or shared with more than one processor, wherein the page characterization information comprises each TLB entry having a one bit field indicating whether the page is private or shared, and wherein the page characterization information comprises each TLB entry having a field indicating the processor identification (ID) of the processor owning the page; and
    performing a snoop request only if the one bit field in the page characterization information indicates the page is shared with more than one processor.

10. The method of claim 9 wherein the processor ID field being log (N) bits where N is the number of processors in the apparatus.

11. The method of claim 10 wherein each TLB entry further comprises a page sharing bits field indicating a processor requesting the page.

12. The method of claim 9 wherein the physical memory further comprises a page table and further comprising the step of saving, in the page table of the physical memory, the page table characterization information of each entry in the TLBs.

13. The method of claim 10 wherein the physical memory further comprises a page table having page table entries and further comprising the step of saving, in the page table of the physical memory, the field indicating whether the page in the TLB entry is private or shared and the field indicating the processor identification (ID) of the processor owning the page in the TLB entry.

14. The method of claim 11 wherein the physical memory further comprises a page table having page table entries and further comprising the step of saving, in the page table of the physical memory, the field indicating whether the page in the TLB entry is private or shared, the field indicating the processor identification (ID) of the processor owning the page in the TLB entry and the page sharing bits field indicating the processor requesting the page in the TLB entry.

15. A computer program product for reducing broadcasts in multiprocessors comprising a plurality of processors; a plurality of memory caches associated with the processors; a plurality of translation lookaside buffers (TLBs) associated with the processors and comprising a plurality of entries for translation of a page of addresses from virtual memory to physical memory, each TLB entry having a field indicating a virtual page number with each page being a block of contiguous virtual memory addresses; and a physical memory shared with the processors, memory caches and TLBs and comprising:
- a computer readable non-transitory storage medium having computer readable program code embodied therewith, the computer readable program code comprising:
- computer readable program code configured to process a memory request from a processor;
- computer readable program code configured to perform a lookup in at least one TLB for virtual to physical address translation;
- computer readable program code configured to read page characterization information from a TLB entry indicating whether the page is private to one processor or shared with more than one processor, wherein the page characterization information comprises each TLB entry having a one bit field indicating whether the page is private or shared, and wherein the page characterization information comprises each TLB entry having a field indicating the processor identification (ID) of the processor owning the page; and
- computer readable program code configured to perform a snoop request only if the one bit field in the page characterization information indicates the page is shared with more than one processor.

16. The computer program product of claim 15 wherein each TLB entry further comprises a page sharing bits field indicating a processor requesting the page.

17. The computer program product of claim 15 wherein the physical memory further comprises a page table and further comprising computer readable program code configured to save, in the page table of the physical memory, the page table characterization information of each entry in the TLBs.

18. The computer program product of claim 15 wherein the physical memory further comprises a page table having page table entries and further comprising computer readable program code configured to save, in the page table of the physical memory, the field indicating whether the page in the TLB entry is private or shared and the field indicating the processor identification (ID) of the processor owning the page in the TLB entry.

19. The computer program product of claim 16 wherein the physical memory further comprises a page table having page table entries and further comprising computer readable program code configured to save, in the page table of the physical memory, the field indicating whether the page in the TLB entry is private or shared, the field indicating the processor identification (ID) of the processor owning the page in the TLB entry and the page sharing bits field indicating the processor requesting the page in the TLB entry.

* * * * *